United States Patent
Kennedy et al.

(10) Patent No.: US 7,139,034 B2
(45) Date of Patent: Nov. 21, 2006

(54) POSITIONING OF A CURSOR ASSOCIATED WITH A DYNAMIC BACKGROUND

(75) Inventors: Howard Kennedy, Hamilton Square, NJ (US); Sedim Al-Araji, Ocean Port, NJ (US); Carlo Basile, Princeton, NJ (US)

(73) Assignee: Princeton Video Image, Inc., Lawrenceville, NJ (US)

(*) Notice: Subject to any disclaimer, the term of this patent is extended or adjusted under 35 U.S.C. 154(b) by 446 days.

(21) Appl. No.: 10/115,136

(22) Filed: Apr. 4, 2002

(65) Prior Publication Data

US 2003/0189670 A1  Oct. 9, 2003

(51) Int. Cl.
*H04N 5/225* (2006.01)

(52) U.S. Cl. .................................... 348/601

(58) Field of Classification Search ........ 345/642–638, 345/719, 157; 348/563; 725/37, 112, 113, 725/131, 136, 139, 137
See application file for complete search history.

(56) References Cited

U.S. PATENT DOCUMENTS 5,287,177 A * 2/1994 Kim ........................... 348/169
6,225,978 B1 * 5/2001 McNeil ....................... 345/157
6,252,579 B1 * 6/2001 Rosenberg et al. .......... 715/856
6,859,199 B1 * 2/2005 Shi ............................. 345/166
2002/0075407 A1 * 6/2002 Cohen-Solal ................ 348/565
2002/0080239 A1 * 6/2002 Ikeda et al. ................. 348/207

FOREIGN PATENT DOCUMENTS

JP    2001-255979    * 9/2001
WO    WO 98/57718   * 12/1998

* cited by examiner

*Primary Examiner*—Paulos M. Natnael
(74) *Attorney, Agent, or Firm*—Sterne, Kessler, Goldstein & Fox PLLC

(57) ABSTRACT

A system and method for positioning a cursor associated with a dynamic background is described. In a first step, the position of the dynamic background in a first frame is calculated. In a second step, the position of the dynamic background in a second frame is calculated. In a third step, the change in position of the dynamic background from the first frame to the second frame is calculated. Lastly, the position of the cursor in the second frame is adjusted according to the change in position of the dynamic background. The change in position of the dynamic background from the first frame to the second frame can be calculated in one, two or three dimensions. Likewise, the position of the cursor in the second frame can be adjusted in one, two or three dimensions. This advantage allows for easier positioning of the cursor by a user on a desired object in the display.

19 Claims, 5 Drawing Sheets

POSITIONING OF A CURSOR ASSOCIATED WITH A DYNAMIC BACKGROUND

CROSS REFERENCE TO RELATED APPLICATIONS

This patent application is related to the following commonly owned U.S. Patents: U.S. Pat. No. 5,892,554, to DiCicco et al, entitled "System and Method for Inserting Static and Dynamic Images Into a Live Video Broadcast" and U.S. Pat. No. 6,100,925, to Rosser et al, entitled "Image Insertion in Video Streams Using a Combination of Physical Sensors and Pattern Recognition." The foregoing U.S. Patents are hereby incorporated by reference in their entirety.

BACKGROUND OF THE INVENTION

1. Field of the Invention

This invention relates to the field of cursor positioning. More specifically, this invention relates to cursor positioning in a video broadcast.

2. Background Art

Many computer applications use a mouse-driven cursor to allow a user to interact with the display. The cursor is generally used to perform a function, such as selection, on a displayed object. For example, the user can locate the cursor over an object, and then click a mouse button in order to select the object. Typically, a displayed object is in a fixed position in the display. This provides little difficulty for the user to position the cursor over the object before clicking on the object. When the desired object is not in a fixed position in the display, however, the task of positioning the cursor over the object can become more difficult.

In one example, a live video broadcast of a baseball game can allow a user to interact with the display using a cursor. In this example, objects, such as bases, can be clicked in order to retrieve information. For example, a user can use a remote control with directional buttons to move a cursor and click on the bases in order to retrieve statistics on the corresponding baseman. The composition of the live video broadcast, however, is constantly varying. That is, as different cameras are used, or as the pan, tilt and zoom of a camera is adjusted, the position of the objects in the user's display changes. Thus, if the position of the first base is initially on the right side of the user's display, then, as the camera pans to the right, the position of the first base will begin to move to the left side of the user's display. Typically, a cursor only moves in response to a user's movement of a mouse or other device. Thus, as an object in the display moves, the cursor stays put. If the user desires to click on the moving object, the user must chase the moving object around the screen with the cursor in order to click on it. This makes the user's task of clicking on the object more difficult. This is also annoying for the user.

Accordingly, what is needed is a system and method for allowing a user to easily place a cursor on a moving object in the display.

BRIEF SUMMARY OF THE INVENTION

The present invention relates to a system and method for positioning a cursor associated with a dynamic background.

In an embodiment of the present invention, a cursor associated with a dynamic background is described. In a first step, the position of the dynamic background in a first frame is calculated. In a second step, the position of the dynamic background in a second frame is calculated. In a third step, the change in position of the dynamic background from the first frame to the second frame is calculated. Lastly, the position of the cursor in the second frame is adjusted according to the change in position of the dynamic background. The change in position of the dynamic background from the first frame to the second frame can be calculated in one, two or three dimensions. Likewise, the position of the cursor in the second frame can be adjusted in one, two or three dimensions.

The present invention automatically changes the position of a cursor in a display in accordance with the movement of the background in the display. This advantage allows for easier positioning of the cursor by a user on a desired object in the display.

Further features and advantages of the invention as well as the structure and operation of various embodiments of the present invention are described in detail below with reference to the accompanying drawings.

BRIEF DESCRIPTION OF THE FIGURES

The features and advantages of the present invention will become more apparent from the detailed description set forth below when taken in conjunction with the drawings in which like reference numbers indicate identical or functionally similar elements. Additionally, the left-most digit of a reference number identifies the drawing in which the reference number first appears.

DETAILED DESCRIPTION OF THE INVENTION

Table of Contents

I. Overview
II. Cursor Positioning System Architecture
III. Cursor Positioning Process
IV. Computer System
V. Conclusion

I. Overview

The present invention relates to a system and method for positioning a cursor on a moving object in a video broadcast. The present invention automatically changes the position of a cursor on a display in accordance with the movement of the object in the display. This advantage allows for easier positioning of the cursor by a user on a desired object. The cursor thus "sticks" to a particular object within the video image.

The present invention is described in terms of the examples contained herein. This is for convenience only and is not intended to limit the application of the present invention. In fact, after reading the following description, it will be apparent to one skilled in the relevant art(s) how to implement the following invention in alternative embodiments.

II. Cursor Positioning System Architecture

Figure 1:
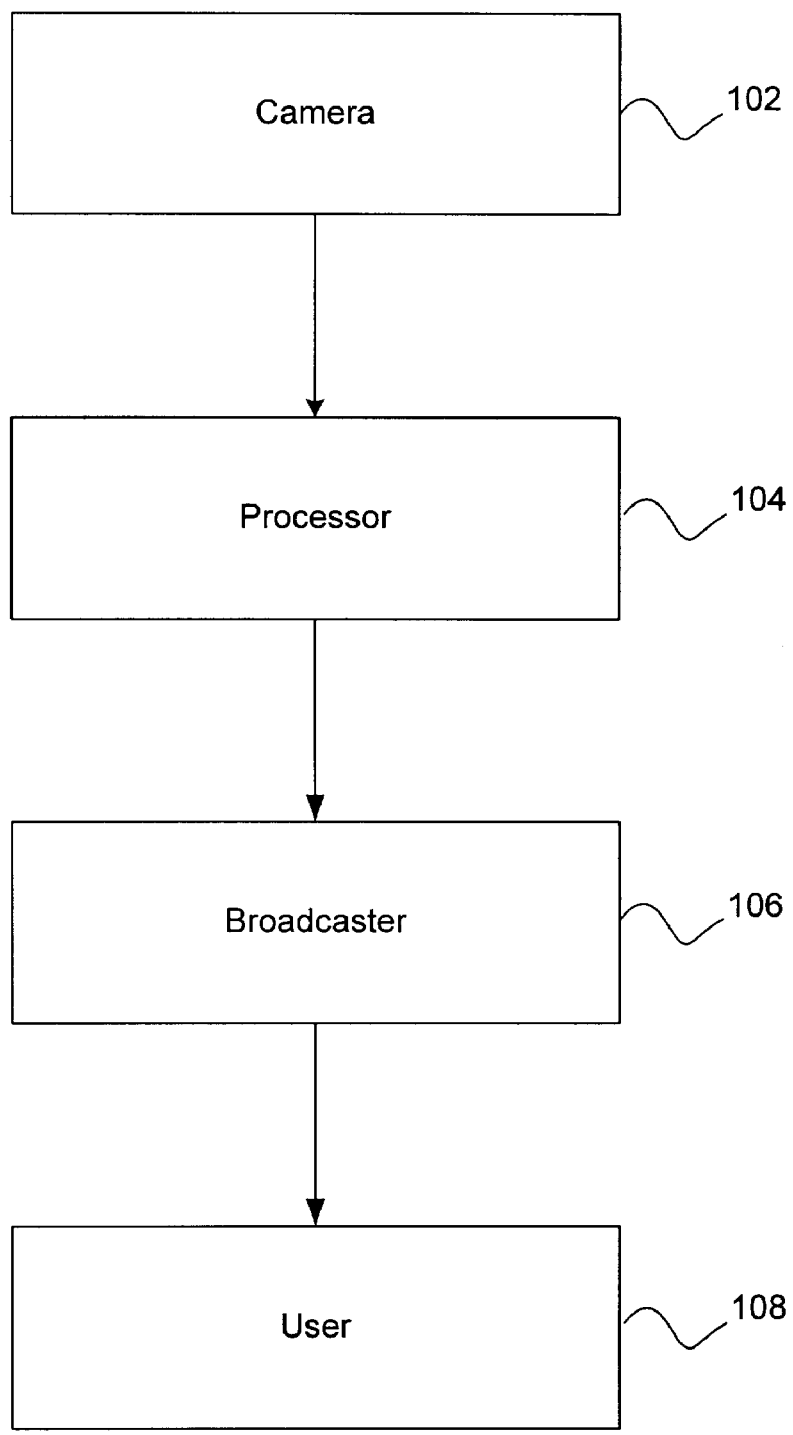
FIG. 1 is a block diagram illustrating the system architecture of an embodiment of the present invention, showing connectivity among the various components.

FIG. 1 is a block diagram illustrating the system architecture of an embodiment of the present invention, showing connectivity among the various components. FIG. 1 shows an example system 100 that supports the positioning of a cursor associated with a dynamic background.

System 100 includes a camera 102, a processor 104, a broadcaster 106 and a user 108. In one embodiment, camera 102 can be any source of Phase Alternating Line (PAL) or National Television Standards Committee (NTSC) video. Preferably, camera 102 will be a standard television camera, usually in a sports setting. Processor 104 encompasses a system for image processing. Processor 104 includes a system for positioning a cursor against a dynamic background, as well as a system for inserting images into a live video broadcast, such as a Live Video Insertion System (LVIS). A live video insertion system (LVIS) is described in greater detail in commonly-owned U.S. Pat. No. 5,892,554. Processor 104 can be implemented in software, hardware or any combination of any of the two.

Broadcaster 106 is any device which has the capability of broadcasting the PAL or NTSC video that has been modified by processor 104. Preferably, broadcaster 106 is the standard broadcasting system used by television networks to transmit their broadcasts. User, or viewer, 108 is a person and a television, which can include a set-top box. The user views the live video broadcast on the television display.

In accordance with one embodiment of the invention, it is desired that user 108 can interact with background objects in a live video broadcast using a user-driven cursor. It is also desired that the ability of user 108 to position the cursor is facilitated. Camera 102 captures footage of a sporting event and produces live video which is sent to processor 104. Processor 104 then commences processing. Processor 104 can insert images into the live video. Processor 104 can also perform processing for use in positioning a cursor against a dynamic background. Then, processor 104 sends the modified live video to broadcaster 106. Broadcaster 106 receives the modified live video and proceeds to broadcast it. Subsequently, user 108 receives the broadcast video. User 108 can then interact with background objects in the display using a user-driven cursor. Due to the cursor positioning processing that has occurred beforehand, the cursor is positioned against a dynamic background, making it easier for user 108 to move the cursor. Importantly, processing of the image can occur upstream from the setp-top box or downstream from the broadcaster.

III. Cursor Positioning Process

Figure 2:
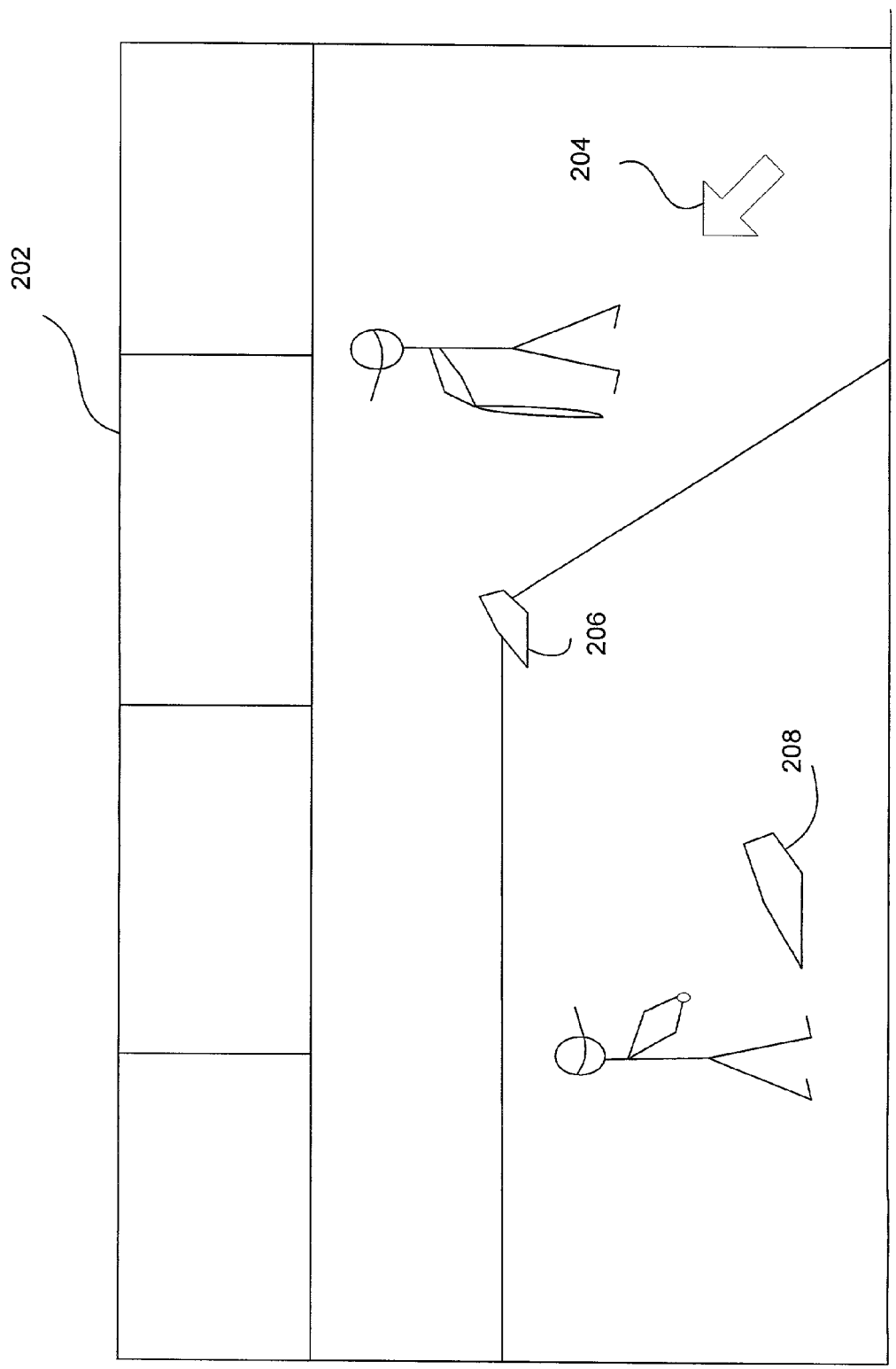
FIG. 2 is an illustration of a display of a video broadcast, including objects with which a user may interact, in an embodiment of the present invention.

FIG. 2 is an illustration 200 of a display 202 of a live video broadcast, including background objects with which user 108 may interact, in an embodiment of the present invention. Display 202 shows a baseball game being broadcast live, as it would be viewed by user 108 (see FIG. 1). In this embodiment, user 108 can utilize a cursor 204 to interact with certain background objects in the video broadcast. User 108 can control cursor 204 using, for example, a remote control with directional buttons. In one example, home plate 206 and pitcher's mound 208 are background objects with which user 108 can interact using the cursor. Thus, user 108 can interact with home plate 206 and the pitcher's mound 208 by positioning the cursor over the object and clicking on it. User 108 can then retrieve information, such as the statistics of the player on that base.

Figure 3:
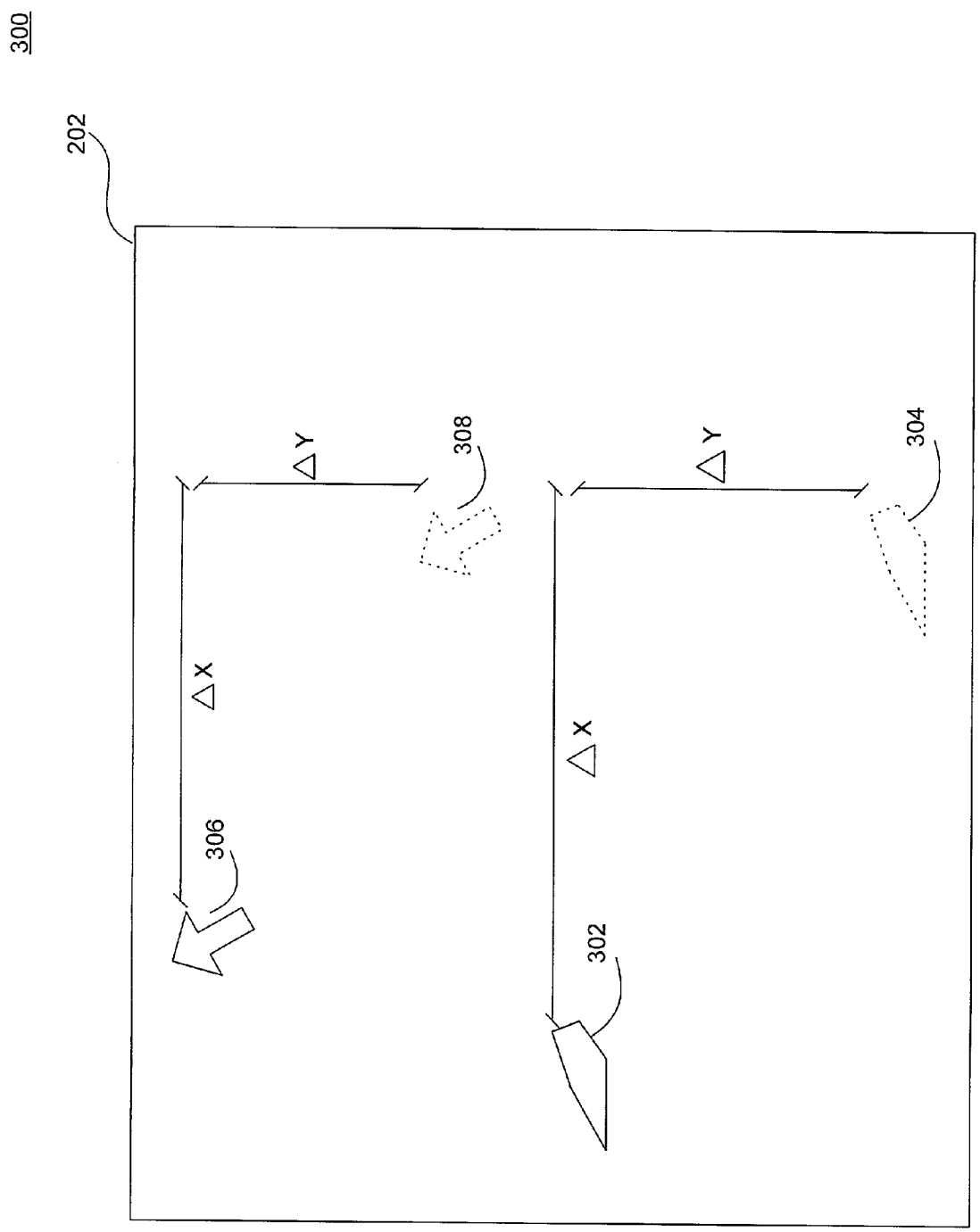
FIG. 3 is an illustration of a display of a video broadcast, including the movement of the background and the cursor in two axes, in an embodiment of the present invention.

FIG. 3 is an illustration 300 of a display 202 of a video broadcast, including the movement of the background and the cursor in two axes, in an embodiment of the present invention. Display 202 shows a baseball game video broadcast, including a background object (a base) and a cursor. Display 202 also shows the effect of a camera pan by showing original positions (shown using dotted lines) and current positions (shown using solid lines). Original positions refer to a first frame of video, while current positions refer to a subsequent, or second, frame of video occurring after the camera pan has been performed. On the right of display 202, the original position of the cursor 308 is shown. Also, on the right of display 202, the original position of the base 304 is shown. On the left of display 202, the current position of the cursor 306 is shown. Also, on the left of display 202, the current position of the base 302 is shown.

In an embodiment of the invention, illustration 300 shows that the camera has panned down and to the right resulting in the uniform movement up and to the left of the background objects in display 202. As such, from the first frame to the second frame, the base has moved to the left of display 202 by $\Delta x$. In addition, all background objects in display 202 have moved up in display 202 by $\Delta y$. As such, from the first frame to the second frame, the base has moved up in the display 202 by $\Delta y$.

In an embodiment of the present invention, a camera pan occurs. This results in the movement of the background objects in display 202 (as shown in FIG. 3), from the first frame of video to the second frame of video. Thereupon, it is desired that the position of the cursor is modified to reflect the movement of the background. Next, the change in position of the background is calculated. This is accomplished by calculating $\Delta x$ and $\Delta y$, as shown above. The way in which $\Delta x$ and $\Delta y$ is calculated is described in greater detail below. Subsequently, the position of the cursor in the second frame is modified using the calculated $\Delta x$ and $\Delta y$. In doing so, the cursor's position is merged with $\Delta x$ and $\Delta y$. The way in which the cursor's position is merged with $\Delta x$ and $\Delta y$ is described in greater detail below. As a result, the position of the cursor is modified to reflect the movement of the background and thus, the movement of the cursor by the user is facilitated.

In an embodiment of the present invention, the calculation of $\Delta x$ and $\Delta y$ can be accomplished using pattern recognition and/or camera sensor data. Image insertion into a live video broadcast, using a combination of physical sensors and pattern recognition is described in greater detail in commonly-owned U.S. Pat. No. 6,100,925, described above. In one alternative for calculating $\Delta x$ and $\Delta y$, the camera capturing the video broadcast is equipped with sensors that detect the movement of the camera. A camera generally can be moved in three ways: tilt, pan and zoom. Tilt refers to the movement of the camera in the y-axis, otherwise known as "up and down", or pitch. Pan refers to the movement of the camera in the x-axis, otherwise known as "side-to-side", or yaw. Zoom refers to the telescoping effect of the camera, where an image can be amplified to render more detail. The sensors can capture this movement and this information can be used to deduce the change of position of the background from one frame to the next. This is described in greater detail in U.S. Pat. No. 6,100,925.

In another alternative for calculating $\Delta x$ and $\Delta y$, image recognition can be used. In this alternative, image recognition is used to recognize certain objects in display 202. The position of a recognized object in a first frame is logged.

Subsequently, when the camera moves, the position of the object in display 202 changes. Then, the current position of the recognized object in a second frame is logged. Subsequently, using the logged information, the change in position of the recognized object, from the first frame to the second frame, is calculated. This is also described in greater detail in U.S. Pat. No. 6,100,925. Additionally, a combination of image recognition and camera sensor data can be used to determine the change in position of the background from one from to the next.

Figure 4:
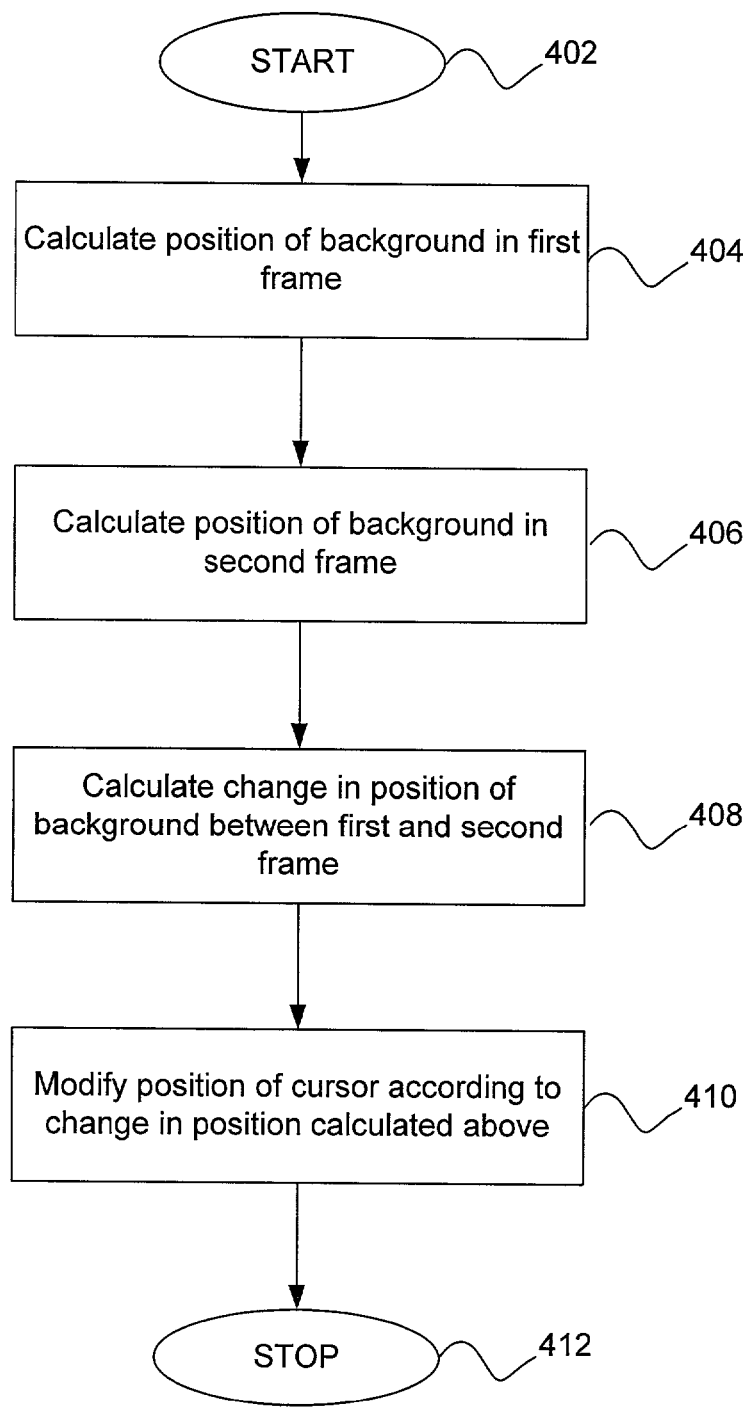
FIG. 4 is a flowchart depicting an embodiment of the operation and control flow of the cursor positioning system of the present invention.

FIG. 4 is a flowchart depicting an embodiment of the operation and control flow 400 of the cursor positioning system of the present invention. Flow 400 shows how a cursor's position is modified against a dynamic background. Control flow 400 begins at step 402, with control passing immediately to step 404. For the purpose of this exemplary embodiment of the present invention, display 202 (see FIG. 2) will be referred to using a standard, two-dimensional coordinate system whereby the origin (0,0) is located at the bottom, left-hand corner of the display.

In step 404, the position of the background is calculated in a first frame of video. The result of this step is the calculation of a coordinate. One way of accomplishing this task is by establishing the coordinates of a point in the background in the first frame. For example, a point within an object in the background can be used. Using FIG. 3 as an example, the pointed tip of pitcher's mound 304 can be used to establish these coordinates. Coordinates $(x_0, y_0)$ refer these first coordinates.

In step 406, the position of the background is calculated in a second frame of video. The result of this step is also the calculation of a coordinate. The position of the background in the second frame can be calculated in the same way that the position of the background in the first frame is calculated. Coordinates $(x_1, y_1)$ refer to these second coordinates.

In step 408, the change in position of the background, between the first and second frames, is calculated. The result of this step is also the calculation of a coordinate. This can be accomplished by subtracting the position of the background in the second frame from the position of the background in the first frame. Thus, the desired coordinate can be:

$$(\Delta x, \Delta y), \text{where}$$
$$\Delta x = x_1 - x_0$$
$$\Delta y = y_1 - y_0$$

In step 410, the position of the cursor in the second frame is modified to reflect the change in position of the background, as calculated above. This can be accomplished by adding $(\Delta x, \Delta y)$ to the coordinate of the cursor in the first frame. Thus, if the coordinate of the cursor in the first frame is $(m_0, n_0)$, then the coordinate of the cursor in the second frame can be calculated as:

$$(m_1, n_1), \text{where}$$
$$m_1 = m_0 + \Delta x$$
$$n_1 = n_0 + \Delta y$$

Subsequently, the position of the cursor in the second frame is set to the new coordinate $(m_1, n_1)$. It should be noted that in the event that the new coordinate is not located in the display, i.e., if the new coordinate is located outside the range of possible values for the display, then a default coordinate can be used for the cursor in the second frame. The default coordinate can be the same as the position of the cursor in the last frame having a valid coordinate. The default coordinate can also be the coordinates corresponding to the middle of the display.

In step 412, flow 400 ceases.

It should be noted that the process of flow 400 need not be performed by one particular module. Neither is it necessary for one module to perform the entire process of flow 400. Rather, the process of flow 400 can be performed piecewise by more than one component. For example, the process of flow 400 can be performed solely by processor 104. In this example, the modified coordinates (see step 410) of the cursor must be transmitted by broadcaster 106 to user 108 for display. In another example, the process of flow 400 can be performed solely by user 108. In this example, a set-top-box is used to perform the process of flow 400. Also, if camera sensor data is used to calculate the movement of the background, the camera sensor data must be transmitted by broadcaster 106 to user 108 for use in the process flow 400. In another example, step 402 to step 408, which results in the calculation of $\Delta x$ and $\Delta y$, can be performed by processor 104, while step 410 to step 412 can be performed by user 108. In this example, a set-top-box is used to perform step 410 and step 412. Also, the values of $\Delta x$ and $\Delta y$ must be transmitted by broadcaster 106 to user 108 for use in steps 410 and step 412.

The cursor is typically generated and inserted at the set-top box. Alternatively, the cursor can be generated and inserted into the video stream by the broadcaster 106. In this embodiment, control of the cursor position is still typically performed by the set-top box. But data regarding the cursor position must be passed upstream from the set-top box to the broadcaster to maintain accurate cursor positioning. It should be appreciated that the location of the processing is not important. Data (e.g., cursor position, camera senor data, pattern recognition data, etc.) can be generated and applied to the cursor position at any point in the system 100.

The invention allows a user to interact with a video stream in a productive manner. The user does not need to chase an object within the video stream in order to "select" the object to obtain data. Rather, the invention allows the cursor to "stick" to a particular object within the video image, thus allowing data to be retrieved more easily.

IV. Computer System

The functions performed by processor 104, which is capable of live video insertion and cursor positioning processing as shown in control flow 400, are preferably implemented in software. Alternatively, the same may be implemented using hardware or a combination of hardware and software.

Figure 5:
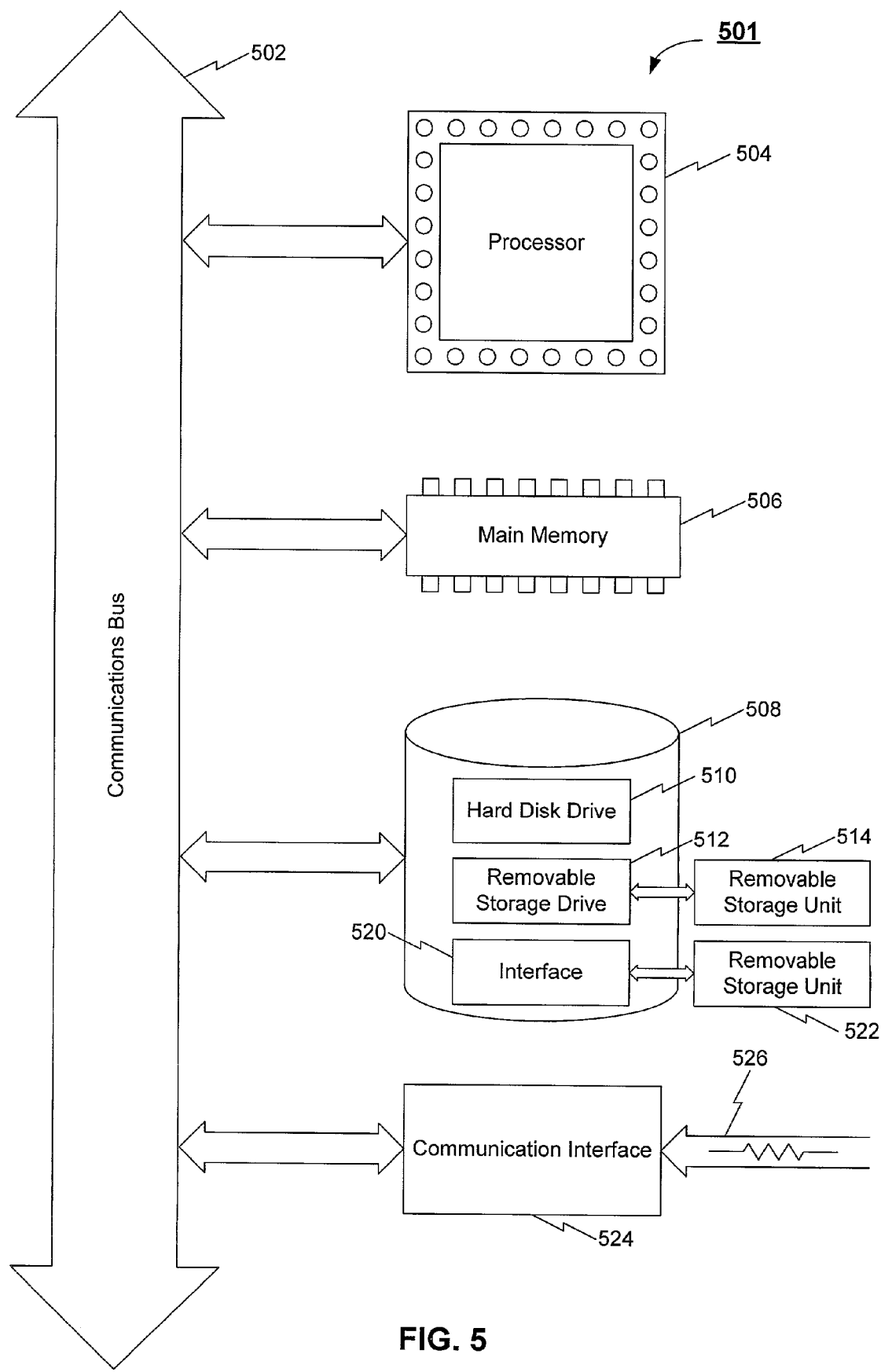
FIG. 5 is an example computer system and computer program product that can be used to implement the present invention.

In an embodiment of the present invention, processor 104 comprises a computer system which may be connected to a network. An example of such a computer system 500 is shown in FIG. 5. The computer system 500 represents any single or multi-processor computer. Single-threaded and multi-threaded computers can be used. Unified or distributed memory systems can be used.

The computer system 500 includes one or more processors, such as processor 504. One or more processors 504 can execute software implementing the operations described in FIG. 3 and FIG. 4 above. Each processor 504 is connected to a communication bus 502 (e.g., cross-bar or network).

Various software embodiments are described in terms of this exemplary computer system. After reading this description, it will become apparent to a person skilled in the relevant art how to implement the invention using other computer systems and/or computer architectures.

Computer system 500 also includes a main memory 506, preferably random access memory (RAM), and can also include a secondary memory 508. The secondary memory 508 can include, for example, a hard disk drive 510 and/or a removable storage drive 512, representing a floppy disk drive, a magnetic tape drive, an optical disk drive, etc. The removable storage drive 512 reads from and/or writes to a removable storage unit 514 in a well known manner. Removable storage unit 514 represents a floppy disk, magnetic tape, optical disk, etc., which is read by and written to by removable storage drive 512. As will be appreciated, the removable storage unit 514 includes a computer usable storage medium having stored therein computer software and/or data.

In alternative embodiments, secondary memory 508 can include other means for allowing computer programs or other instructions to be loaded into computer system 500. Such means can include, for example, a removable storage unit 522 and an interface 520. Examples can include a program cartridge and cartridge interface (such as that found in video game devices), a removable memory chip (such as an EPROM, or PROM) and associated socket, and other removable storage units 522 and interfaces 520 which allow software and data to be transferred from the removable storage unit 522 to computer system 500.

Computer system 500 can also include a communications interface 524. Communications interface 524 allows software and data to be transferred between computer system 500 and external devices via communications path 526. Examples of communications interface 520 can include a modem, a network interface (such as Ethernet card), a communications port, etc. Software and data transferred via communications interface 524 are in the form of signals which can be electronic, electromagnetic, optical or other signals capable of being received by communications interface 524, via communications path 526. Note that communications interface 524 provides a means by which computer system 500 can interface to a network such as the Internet.

The present invention can be implemented using software running (that is, executing) in an environment similar to that described above with respect to FIG. 5. In this document, the term "computer program product" is used to generally refer to removable storage unit 514, a hard disk installed in hard disk drive 510, or a carrier wave carrying software over a communication path 526 (wireless link or cable) to communication interface 524. A computer useable medium can include magnetic media, optical media, or other recordable media, or media that transmits a carrier wave. These computer program products are means for providing software to computer system 500.

Computer programs (also called computer control logic) are stored in main memory 506 and/or secondary memory 508. Computer programs can also be received via communications interface 524. Such computer programs, when executed, enable the computer system 500 to perform the features of the present invention as discussed herein. In particular, the computer programs, when executed, enable the processor 504 to perform the features of the present invention. Accordingly, such computer programs represent controllers of the computer system 500.

In an embodiment where the invention is implemented using software, the software can be stored in a computer program product and loaded into computer system 500 using removable storage drive 512, hard drive 510, or communications interface 524. Alternatively, the computer program product can be downloaded to computer system 500 over communications path 524. The control logic (software), when executed by the one or more processors 504, causes the processor(s) 504 to perform the functions of the invention as described herein.

In another embodiment, the invention is implemented primarily in firmware and/or hardware using, for example, hardware components such as application specific integrated circuits (ASICs). Implementation of a hardware state machine so as to perform the functions described herein will be apparent to persons skilled in the relevant art(s).

V. Conclusion

While various embodiments of the present invention have been described above, it should be understood that they have been presented by way of example, and not limitation. It will be apparent to persons skilled in the relevant art(s) that various changes in form and detail can be made therein without departing from the spirit and scope of the invention. Thus the present invention should not be limited by any of the above-described exemplary embodiments, but should be defined only in accordance with the following claims and their equivalents.

What is claimed is:

1. A method for associating the position of a cursor with the position of a background in a display, wherein the background is dynamic, comprising the steps of:
    (a) calculating the position of the background in a first frame;
    (b) calculating the position of the background in a second frame;
    (c) calculating the change in position of the background from said first frame to said second frame; and
    (d) modifying the position of the cursor in said second frame in accordance with the change in position of the background, as calculated in step (c), wherein said modifying facilitates positioning of the cursor by a user;
    and wherein steps (a) and (b) are performed upstream from a set-top box.

2. The method of claim 1, wherein steps (a) and (b) are performed using pattern recognition.

3. The method of claim 1, wherein steps (a) and (b) are performed using camera sensor data.

4. The method of claim 1, wherein steps (a) and (b) are performed using pattern recognition and camera sensor data.

5. The method of claim 1, wherein step (c) is performed by a set-top box.

6. The method of claim 1, wherein step (c) is performed upstream from a set-top box.

7. The method of claim 1, wherein step (d) is not performed if the change in position of the background results in the cursor not being displayed.

8. A method for associating the position of a cursor with the position of a background in a display, wherein the background is dynamic, comprising the steps of:
    (a) calculating the position of the background in a first frame;
    (b) calculating the position of the background in a second frame;
    (c) calculating the change in position of the background from said first frame to said second frame; and
    (d) modifying the position of the cursor in said second frame in accordance with the change in position of the background, as calculated in step (c), wherein said modifying facilitates positioning of the cursor by a user;

and wherein step (c) is performed by a set-top box.

9. The method of claim 8, wherein steps (a) and (b) are performed using pattern recognition.

10. The method of claim 8, wherein steps (a) and (b) are performed using camera sensor data.

11. The method of claim 8, wherein steps (a) and (b) are performed using pattern recognition and camera sensor data.

12. The method of claim 8, wherein step (d) is not performed if the change in position of the background results in the cursor not being displayed.

13. The method of claim 8 wherein steps (a) and (b) are performed upstream from a set-top box.

14. A method for associating the position of a cursor with the position of a background in a display, wherein the background is dynamic, comprising the steps of:
 (a) calculating the position of the background in a first frame;
 (b) calculating the position of the background in a second frame;
 (c) calculating the change in position of the background from said first frame to said second frame; and
 (d) modifying the position of the cursor in said second frame in accordance with the change in position of the background, as calculated in step (c), wherein said modifying facilitates positioning of the cursor by a user;

and wherein step (c) is performed upstream from a set-top box.

15. The method of claim 14, wherein steps (a) and (b) are performed using pattern recognition.

16. The method of claim 14, wherein steps (a) and (b) are performed using camera sensor data.

17. The method of claim 14, wherein steps (a) and (b) are performed using pattern recognition and camera sensor data.

18. The method of claim 14, wherein step (d) is not performed if the change in position of the background results in the cursor not being displayed.

19. The method of claim 14, wherein steps (a) and (b) are performed upstream from a set-top box.

* * * * *